United States Patent [19]

Tanisake et al.

[11] Patent Number: 4,943,607
[45] Date of Patent: Jul. 24, 1990

[54] FIBER-REINFORCED UNSATURATED POLYESTER

[75] Inventors: Hiroka Tanisake; Hiroyuki Okumura, both of Hiratsuka; Akira Namikawa, Fujisawa; Masato Ishikawa, Hiratsuka; Toshiaki Abe, Yokohama, all of Japan

[73] Assignee: Mitsubishi Gas Chemical Company, Inc., Tokyo, Japan

[21] Appl. No.: 237,229

[22] Filed: Aug. 26, 1988

[30] Foreign Application Priority Data

Aug. 31, 1987 [JP] Japan .................................. 62-215492

[51] Int. Cl.$^5$ .............................................. C08K 7/02
[52] U.S. Cl. .................................... 523/500; 523/512; 523/527
[58] Field of Search ...................... 523/500, 527, 512; 525/28

[56] References Cited

U.S. PATENT DOCUMENTS

| | | | |
|---|---|---|---|
| 3,824,201 | 7/1974 | McGranaghan et al. | 523/500 |
| 4,327,145 | 4/1982 | Mitani et al. | 428/290 |
| 4,822,849 | 4/1989 | Vanderlaan | 525/28 |

FOREIGN PATENT DOCUMENTS

| | | | |
|---|---|---|---|
| 0631690 | 11/1961 | Canada | 525/28 |
| 0016248 | 10/1980 | European Pat. Off. | |
| 0072024 | 2/1983 | European Pat. Off. | |

*Primary Examiner*—Lewis T. Jacobs
*Attorney, Agent, or Firm*—Wenderoth, Lind & Ponack

[57] ABSTRACT

The invention relates to fiber-reinforced unsaturated polyester resin compositions comprising an unsaturated polyester (A) obtained from a dicarboxylic acid containing unsaturated dicarboxylic acid or its anhydride, or an anhydride of the dicarboxylic acid and a polyhydric alcohol, a polyisocyanate (B), a polymerizable vinyl monomer (C), and a fiber (D), which produce molded articles having excellent impact resistance and improved moldability.

5 Claims, No Drawings

1

FIBER-REINFORCED UNSATURATED POLYESTER

FIELD OF THE INVENTION

This invention relates to a novel fiber-reinforced unsaturated polyester resin composition giving molded articles having excellent impact resistance and improved moldability.

PRIOR ARTS OF THE INVENTION

Unsaturated polyester resins can be obtained by dissolving an unsaturated polyester formed by a polycondensation reaction between a mixture of an unsaturated dicarboxylic acid or its anhydride with a saturated dicarboxylic acid or its anhydride and a polyhydric alcohol, together with a polymerizable vinyl monomer, a polymerization inhibitor, etc., and the resultant unsaturated resins are in the liquid form.

Cured products of the above unsaturated polyester resins are excellent in properties of mechanical strength, chemical resistance, heat resistance and the like. By utilizing these properties, unsaturated polyester resins are now in use as a casting, coating or decorative sheet-forming material. Since, however, unsaturated polyester resins are lacking in stiffness and toughness, they have to be used in combination with a fiber, etc., when used as a structural material. That is, it is in the form of a fiber-reinforced unsaturated polyester resin that they are widely and effectively used in various molded articles such as boat, ship, bathtub, water tank, septic tank, chemicals storage tanks, and the like.

The use of unsaturated polyester resins in combination with a fiber to obtain fiber-reinforced unsaturated polyester resin composition giving molded articles having excellent impact resistance is a well-known method. However, such fiber-reinforced unsaturated polyester resins are not sufficient for use in applications requiring higher impact resistance, for examples, member for automobile outer structure, bumper beam, helmet, etc.

As a method of obtaining molded articles having higher impact resistance from fiber-reinforced unsaturated polyester resin compositions, methods of using an unsaturated polyester resin having a comparatively high molecular weight, of using an unsaturated polyester resin excellent in flexibility and tenacity and further, of using a larger amount of a reinforcing fiber, etc., are known.

However, a high molecular weight, unsaturated polyester resin has a high viscosity, and causes a problem on impregnation to a fiber, although it shows a liquid-like appearance in a room temperature, and therefore it is not satisfactory in view of molding workability. And the appearances, strengths and elastic moduli of the resulting molded articles are not satisfactory, either.

The use of a conventionally known urethane-modified unsaturated polyester resin having excellent flexibility and tenacity can provide a fiber-reinforced unsaturated polyester resin composition giving molded articles having improved impact resistance. However, such a polyester resin has a defect that it cannot always provide a composition which is satisfactory in molding workability. For producing molded articles excellent in impact resistance by preparing a sheet-like molding material without sticking nature and with excellent flowability at the molding time and processing the material by heat press, there is a proposal, for example, of a method of preparing a sheet molding compound from a high molecular weight unsaturated polyester resin, a metal oxide or a metal hydroxide, and a fiber. However, the resultant compound does not have a sufficient impact resistance property. Therefore, in order to improve the above method, there is proposed a method of using an unsaturated polyester resin and a polyisocyanate compound in combination with a fiber to obtain a high impact-resistant composition.

Namely, U.S. Pat. No. 4,327,145 (1982) describes an easily operatable sheet molding compound comprising a resin composition composed of an unsaturated polyester having a hydroxyl value of 20 to 55 mgKOH/g and an acid value of 5 to 20 mgKOH/g in which the ratio of the hydroxyl value to the acid value is in the range of 1.7 to 10, a polymerizable vinyl monomer and a polyisocyanate compound, and a glass fiber. Since, however, the molecular weight of the unsaturated polyester is comparatively high, the unsaturated polyester resin in the liquid form, dissolved in the vinyl monomer, has a high viscosity and therefore, shows insufficient impregnatability to the fiber. Further, residual isocyanate groups in the unreacted state in the sheet molding compound and carboxyl groups of the unsaturated polyester react at the time of heat press molding, and produce carbonic acid gas. For this reason and some others, drawbacks such as whitening and blisters are likely to occur in molded articles. The whitening in molded articles is one of the causes of variability in mechanical strength property of molded articles, thus the above molding compound being unlikely to be a reliable material.

U.S. Pat. No. 4,067,845 (1978) describes a process for producing a press-molding sheet molding compound which comprises an unsaturated polyester having an acid value of not less than 14 mgKOH/g, a molar ratio of hydroxyl group to carboxyl group in the range of 0.8 to 5.7 and a molecular weight of 800 to 5,000, a polyisocyanate compound, a metal oxide or a metal hydroxide, a polymerizable vinyl monomer and a fiber and which thickens by maturing. In order to obtain a press-molding sheet molding compound, the above process utilizes, for the thickening, a reaction between the hydroxyl group of the polyisocyanate compound and the isocyanate group of the polyisocyanate, a decarbonation-involved reaction between the carboxyl group of the unsaturated polyester and the isocyanate group of the polyisocyanate compound and a reaction between said carboxyl group and the metal oxide or metal hydroxide, thus being likely to cause whitening and blisters in the molded articles due to carbonic acid gas.

SUMMARY OF THE INVENTION

It is an object of this invention to provide a fiber-reinforced unsaturated polyester resin composition excellent in molding processability.

It is another object of this invention to provide a fiber-reinforced unsaturated polyester resin composition in which the included resin has an excellent impregnatability to the fiber.

It is another object of this invention to provide a fiber-reinforced unsaturated polyester resin composition giving molded articles excellent in impact resistance and elastic modulus.

It is another object of this invention to provide a fiber-reinforced unsaturated polyester resin composition giving molded articles which do not cause drawbacks such as whitening and blisters and which do not have variability in mechanical strength.

This invention provides a fiber-reinforced unsaturated polyester resin composition comprising, as main components, an unsaturated polyester (A), a polyisocyanate compound (B), a polymerizable vinyl monomer (C) and a fiber (D), ① the unsaturated polyester (A) being obtained from a dicarboxylic acid or its anhydride containing 40 to 100 mole % of an unsaturated dicarboxylic acid or its anhydride and a polyhydric alcohol having a primary hydroxyl group, and having a hydroxyl value of 115 to 210 mgKOH/g and an acid value of not more than 5 mgKOH/g, ② the polyisocyanate compound (B) having its terminal group of

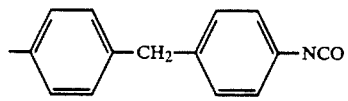

and a viscosity, at 25° C., of 10 to 2,000 cps and being in the liquid state, further, said composition satisfying the following conditions (i), (ii) and (iii);

(i) the proportion of (A) is in the range of 50 to 70% by weight, preferably 60 to 70% by weight, of the total weight of (A) and (C), (ii) the molar ratio of the isocyanate group of (B) to the hydroxyl group of (A) is 0.75 to 1.2, preferably 0.85 to 1.0, and (iii) the proportion of (D) is 50 to 70% by weight of the total weight of (A), (B), (C) and (D).

Further, this invention provides a fiber-reinforced unsaturated polyester resin composition comprising, as main components, an unsaturated polyester (A), a polyhydric alcohol (E), a polyisocyanate compound (B), a polymerizable vinyl monomer (C) and a fiber (D), ① the unsaturated polyester (A) being obtained from a dicarboxylic acid or its anhydride containing 40 to 100 mole % of an unsaturated dicarboxylic acid or its anhydride and a polyhydric alcohol having a primary hydroxyl group, and having a hydroxyl value of 115 to 210 mgKOH/g and acid value of not more than 5 mgKOH/g, ② the polyisocyanate compound (B) having its terminal group of

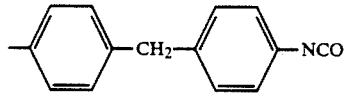

and a viscosity, at 25° C., of 10 to 2,000 cps and being in the liquid state,

③ the polyhydric alcohol (E) having at least 2 hydroxyl groups in the molecule and having a hydroxyl value of 35 to 1,100 mgKOH/g, and further, said composition satisfying the following conditions (i), (ii), (iii) and (iv);

(i) the proportion of (E) is not more than 50% by weight, preferably 10 to 50% by weight, of the total weight of (A) and (E), (ii) the total weight of (A) and (E) is in the range of 50 to 85% by weight, preferably 60 to 80% by weight, of the total weight of (A), (E) and (C), (iii) the molar ratio of the isocyanate group of (B) to the hydroxyl group of (A) and (E) is 0.75 to 1.2, preferably 0.85 to 1.0, and (iv) the proportion of (D) is 50 to 70% by weight of the total weight of (A), (B), (C), (D) and (E).

DETAILED DESCRIPTION OF THE INVENTION

The unsaturated polyester (A) used in the composition of this invention is a polycondensate obtained by a polycondensation reaction known per se between a mixture, as an acid component, of 40 to 100 mole % of an unsaturated dicarboxylic acid or its anhydride with not more than 60 mole % of a saturated dicarboxylic acid or its anhydride and, as an alcohol component, a polyhydric alcohol having a primary hydroxyl group.

And the unsaturated polyester (A) used in this invention has an acid value of not more than 5 mgKOH/g and a hydroxyl value in the range of 115 to 210 mgKOH/g. The molecular weight thereof according to end-group method is, preferably, 500 to 1,000. In this invention, a fiber-reinforced unsaturated polyester composition prepared by using an unsaturated polyester having an acid value of more than 5 mgKOH/g causes whitening and blisters at the hot press molding time and gives rise to a decrease in impact resistance. When the hydroxyl value is less than 115 mgKOH/g, the molecular weight of an unsaturated polyester becomes more than 1,000 (according to end-group method), and its impregnatability to a fiber is deteriorated. When the hydroxyl value is more than 210 mgKOH/g, the molecular weight of an unsaturated polyester becomes less than 500 (according to end-group method), and the impact resistance is insufficient although the impregnatability to a fiber is good. Thus, the object of this invention cannot be achieved.

Examples of the unsaturated dicarboxylic acid or its anhydride include maleic acid, maleic anhydride, fumaric acid, etc., and examples of the saturated dicarboxylic acid or its acid anhydride include phthalic acid, phthalic anhydride, isophthalic acid, terephthalic acid, HET acid (chlorendic acid), tetrahydrophthalic anhydride, etc.

Examples of the polyhydric alcohol having a primary hydroxyl group include ethylene glycol, diethylene glycol, 1,4-butanediol, neopentyl glycol, etc. Polyhydric alcohols having secondary hydroxyl group such as propylene glycol, dipropylene glycol, an adduct of bisphenol-A with propylene oxide, etc., can also be used in combination. Preferably, however, the amount thereof in use is not more than 5 mole %. The use of an unsaturated polyester prepared by using more than 5 mole % of a polyhydric alcohol having a secondary hydroxyl group gives only molded articles having low impact resistance. Hence, the object of this invention cannot be achieved.

Examples of the polymerizable vinyl monomer (C) mixable with the unsaturated polyester include styrene, chlorostyrene, vinyltoluene, (meth)acrylic acid and its derivative, etc. With regard to proportions of the unsaturated polyester and the polymerizable vinyl monomer, when an unsaturated polyester resin composition is prepared in accordance with the method of this invention, the unsaturated polyester can be used in an amount in the range of 50 to 70% by weight, and the polymerizable vinyl monomer can be used in an amount in the range of 30 to 50% by weight.

The polyisocyanate compound (B) usable in the composition of this invention has a terminal group of

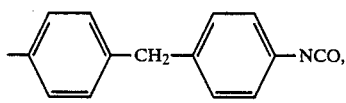

and a viscosity, at 25° C., of 10 to 2,000 cps, preferably 30 to 1,500 cps, and is in the liquid state. That is, examples of said polyisocyanate compound (B) include carbodiimide-modified 4,4'-diphenylmethanediisocyanate (e.g., a commercially available compound called "Isonate 143L"), polyether-type prepolymer of 4,4'-diphenylmethanediisocyanate (e.g., a commercially available compound called "Isonate 181"), polyester-type prepolymer of 4,4'-diphenylmethanediisocyanate (e.g., a commercially available compound called "Isonate 240"), etc. These polyisocyanate compounds (B) are used in such an amount that the molar ratio of the isocyanate group to the hydroxyl group of the unsaturated polyester (A) is 0.75 to 1.2.

Examples of the fiber (D) are, preferably, a glass fiber, carbon fiber and aramid fiber, in view of strength, affinity with resin, price, etc., and a glass fiber is particularly preferable.

Examples of the polyhydric alcohol (E) having at least 2 hydroxyl groups in the molecule and a hydroxyl value of 35 to 1,100 mgKOH/g include diethylene glycol, triethylene glycol, dipropylene glycol, 1,5-pentanediol, 1,6-hexanediol, polyethylene glycol and polypropylene glycol having a molecular weight of 200 to 3,000, polytetramethylene glycol having a molecular weight of 200 to 3,000, etc. In general, glycol having a primary hydroxyl group is preferable, and particularly, polyethylene glycol and polytetramethylene glycol are preferable.

Usable in the unsaturated polyester resin composition are not only customarily used polymerization inhibitors such as hydroquinone, parabenzoquinone, methyl hydroquinone, etc., but also customarily used curing catalysts such as benzoylperoxide, methylethylketoneperoxide, cumene hydroperoxide, t-butylperbenzoate, etc., customarily used curing promotors such as dimethyl aniline, cobalt naphthenate, etc., and customarily used urethane-forming catalysts such as cobalt octoate, dibutyltindilaurate.

The unsaturated polyester resin composition of this invention can be used for press molding, reaction injection molding, etc., which are customarily used in the field of said composition.

The resin composition of this invention can be used, for example, in the following modes.

One of the modes comprises uniformly mixing an unsaturated polyester resin in the liquid form at ambient temperature, which is obtained by mutually dissolving the unsaturated polyester (A), the polymerizable vinyl monomer (C) and the polymerization inhibitor, with the polyisocyanate compound (B) in the liquid form at ambient temperature and a thermally decomposing-type radical polymerization initiator, and then impregnating the mixture to the fiber (D) to preeffect an urethane-forming reaction for the thickening (so-called B-stage formation), thereby to prepare a sheet-like or mass-like molding material without sticking nature but with flow-ability at the hot press molding time. The resulting sheet-like or mass-like molding material without sticking nature can be processed into molded articles excellent in impact resistance by heat press molding to effect a radical polymerization reaction.

Further, another mode comprises filling the fiber (D) into a mold which is formed into a desired shape, and pouring an unsaturated polyester resin in the liquid form at ordinary temperature obtained from (A) and (C) in the same way along the above method and the polyisocyanate compound (B) in the liquid form at ambient temperature (to which a radical polymerization initiator has been added) into the mold kept at a predetermined temperature while these components are uniformly mixed, thereby to effect an urethane-forming reaction and a radical polymerization reaction simultaneously. This mode thus makes it possible to produce molded articles excellent in impact resistance.

In this invention, it is made possible to obtain a fiber-reinforced unsaturated polyester resin composition having improved molding processability and giving molded articles having excellent impact resistance, strength and elastic modulus, by formulating the specified components (A), (B), (C) and (D) or (A), (B), (C), (D) and (E) in the specified proportions. It is possible to obtain a composition suitable, for example, for a member for automobile outer structure, bumper beam, helmet, etc., requiring higher impact resistance.

EXAMPLES

This invention will be explained according to the Examples hereinbelow. However, it shall not be limited to these Examples only.

In the Examples, the hydroxyl values [mgKOH/g] of unsaturated polyesters were measured by the acetylation method, and the acid values [mgKOH/g] and viscosities [cps] thereof were measured according to JIS K6901.

The flexural strengths and flexural moduli of molded articles made of fiber-reinforced unsaturated polyester resin compositions were measured in a similar way along JIS K6919 and the Izod impact strengths thereof (with a notch, in the edge direction) were measured in a similar way along JIS K6911.

The falling weight (dart) impact test was carried out by using a falling weight impact tester with a computer data analyzer, made by CEAST of Italy. In the test, a test piece having a size of 10 cm×10 cm and a thickness of 3 mm was fixed, with a force of 6 kg/cm$^2$, onto a bearer having a 50 mm diameter-hole, and then a striker having a roundness formed, with its diameter of 20 mm, on the falling end was allowed to fall at a speed of 10.0 m/second to punch through the test piece. An impact wave generated was detected by a distortion gauge positioned inside the striker, and the detected information was transmitted to a microcomputer to calculate a maximum impact load (Fmax) [kg], a break initiation energy (Ei) [kg.cm] and a break propagation energy (Ep) [kg.cm].

The test was carried out three times to determine an average value. Fmax and Ei are important factors for evaluation of impact resistance property. Larger values of Fmax and Ei show excellence in impact resistance property. Ep shows a behavior after broken, and larger values of Ep show that the complete breakage of a material is less likely.

SYNTHESIS EXAMPLES (I)–(VI)

Comparative Synthesis Examples (1)–(5)

(Synthesis of unsaturated polyester resin)

Synthesis Example (I), Synthesis of "A-I"

1,348 g of isophthalic acid, 1,657 g of neopentyl glycol and 988 g of ethylene glycol were charged into a reactor equipped with a stirrer, a thermometer, a nitrogen gas-introducing tube and a partial condenser with a thermometer in its column portion, and the mixture was heated up to 205° C. with a nitrogen gas being introduced, to carry out a polycondensation reaction according to customary manner. Steam at 100° C. was flowed in the partial condenser to reflux the glycols and distill condensed water out of the reactor system.

When the acid value of the reaction mixture reached 4.4, the heating was stopped, and the mixture was cooled to 120° C. Then, 1,591 g of maleic anhydride was charged. The temperature of the mixture was again elevated to carry out a polycondensation reaction with a care that the reaction temperature did not exceed 225° C. and to obtain 4,995 g of an unsaturated polyester having an acid value of 1.4 and a hydroxyl value of 130.6. And then the system was cooled to 170° C., and 1.15 g of hydroquinone and 0.25 g of p-benzoquinone were added and mixed sufficiently.

A part of the resultant unsaturated polyester was dissolved in styrene to obtain a 35% styrene-containing unsaturated polyester resin ("A-I"). The viscosity of "A-I", measured at 25° C., was 253 cps.

Synthesis Example (II), Synthesis of "A-II"

13,480 g of isophthalic acid, 16,570 g of neopentyl glycol, 9,880 g of ethylene glycol and 18,840 g of fumaric acid were charged into the same reactor as the one used in Synthesis Example (I), and the mixture was reacted in the same way as in Synthesis Example (I) to synthesize an unsaturated polyester having an acid value of 2.6 and a hydroxyl value of 151.9. The synthesized polyester was dissolved in styrene to obtain a 34.5% styrene-containing unsaturated polyester resin ("A-II"). The viscosity of "A-II", at 25° C., was 263 cps.

Synthesis Example (III), Synthesis of "A-III"

1,035 g of isophthalic acid, 1,687 g of neopentyl glycol, 1,006 g of ethylene glycol and 1,833 g of maleic anhydride were charged into the same reactor as the one used in Synthesis Example (I), and the mixture was reacted in the same way as in Synthesis Example (I) to synthesize an unsaturated polyester having an acid value of 2.6 and a hydroxyl value of 128.8. The synthesized polyester was dissolved in styrene to obtain a 35.5% styrene-containing unsaturated polyester resin ("A-III"). The viscosity of "A-III", at 25° C., was 228 cps.

Synthesis Example (IV), Synthesis of "A-IV"

1,948 g of isophthalic acid, 1,589 g of neopentyl glycol, 947 g of ethylene glycol and 1,150 g of maleic anhydride were charged into the same reactor as the one used in Synthesis Example (I), and the mixture was reacted in the same way as in Synthesis Example (I) to synthesize an unsaturated polyester having an acid value of 1.9 and a hydroxyl value of 127.1. The synthesized polyester was dissolved in styrene to obtain a 36.0% styrene-containing unsaturated polyester resin ("A-IV"). The viscosity of "A-IV", at 25° C., was 254 cps.

Synthesis Example (V), Synthesis of "A-V"

1,282 g of isophthalic acid, 1,728 g of neopentyl glycol, 1,030 g of ethylene glycol and 1,515 g of maleic anhydride were charged into the same reactor as the one used in Synthesis Example (I), and the mixture was reacted in the same way as in Synthesis Example (I) to synthesize an unsaturated polyester having an acid value of 3.0 and a hydroxyl value of 173.1. The synthesized polyester was dissolved in styrene to obtain a 35.7% styrene-containing unsaturated polyester resin ("A-V"). The viscosity of "A-V", at 25° C., was 145 cps.

Synthesis Example (VI), Synthesis of "A-VI"

1,661 g of isophthalic acid, 2,800 g of diethylene glycol and 1,161 g of fumaric acid were charged into the same reactor as the one used in Synthesis Example (I), and the mixture was reacted in the same way as in Synthesis Example (I) to synthesize an unsaturated polyester having an acid value of 4.0 and a hydroxyl value of 117. The synthesized polyester was dissolved in styrene to obtain a 35.3% styrene-containing unsaturated polyester resin ("A-VI"). The viscosity of "A-VI", at 25° C., was 180 cps.

Comparative Synthesis Example (1), Synthesis of "B"

By using the same reactor as the one used in Synthesis Example (I), 1,661 g of isophthalic acid, 2,322 g of fumaric acid, 1,744 g of neopentyl glycol and 1,040 g of ethylene glycol were reacted in the same way as in Synthesis Example (I) to synthesize an unsaturated polyester having an acid value of 2.0 and a hydroxyl value of 74, and then the synthesized polyester was dissolved in styrene to obtain an unsaturated polyester resin ("B") having a styrene content of 35.0% and a viscosity, at 25° C., of 450 cps.

Comparative Synthesis Example (2), Synthesis of "C"

By using the same reactor as the one used in Synthesis Example (I), 1,661 g of isophthalic acid, 2,322 g of fumaric acid and 3,067 g of propylene glycol were reacted in the same way as in Synthesis Example (I) to synthesize an unsaturated polyester having an acid value of 4.0 and a hydroxyl value of 152, and then the synthesized polyester was dissolved in styrene to obtain an unsaturated polyester resin ("C") having a styrene content of 34.5% and a viscosity, at 25° C., of 190 cps.

Comparative Synthesis Example (3), Synthesis of "D"

By using the same reactor as the one used in Synthesis Example (I), 1,661 g of isophthalic acid, 1,161 g of fumaric acid and 1,750 g of propylene glycol were reacted in the same way as in Synthesis Example (I) to synthesize an unsaturated polyester having an acid value of 12.0 and a hydroxyl value of 35.5, and then the synthesized polyester was dissolved in styrene to obtain an unsaturated polyester resin ("D") having a styrene content of 37.5%.

Comparative Synthesis Example (4), Synthesis of "E"

By using the same reactor as the one used in Synthesis Example (I), 1,080 g of isophthalic acid, 2,264 g of fumaric acid, 1,896 g of neopentyl glycol and 633 g of propylene glycol were reacted in the same way as in Synthesis Example (I) to synthesize an unsaturated polyester having an acid value of 25.1 and a hydroxyl value of 20.5, and then the synthesized polyester was dissolved in styrene to obtain an unsaturated polyester resin ("E") having a styrene content of 39.1% and a viscosity, at 25° C., of 1,340 cps.

Comparative Synthesis Example (5), Synthesis of "F"

By using the same reactor as the one used in Synthesis Example (I), 1,846 g of isophthalic acid, 1,635 g of maleic anhydride and 2,220 g of propylene glycol were reacted in the same way as in Synthesis Example (I) to synthesize an unsaturated polyester having an acid value of 25.3, and then the synthesized polyester was dissolved in styrene to obtain an unsaturated polyester resin ("F") having a styrene content of 40.0% and a viscosity, at 25° C., of 1,280 cps.

EXAMPLE 1

6.6 g of t-butyl perbenzoate was added to 661 g of the unsaturated polyester resin "A-1" obtained in Synthesis Example (I), and mixed together with stirring. Further, 130 g of a liquid polyisocyanate compound, Isonate 143L (commercial product name, made by MD Chemical), was added and mixed, and immediately thereafter, the mixture was flowed over onto a polypropylene sheet. Then, 1,469 g of chopped strands (glass fiber) having a length of 1 inch were uniformly dropped and dispersed thereon. And then, the sheet was folded into a half size and the folded sheet was compressed with a roller to carry out deaeration and impregnation of the resin mixture to the chopped strands.

The above sheet-shaped material ("SMC" hereinbelow) was left to stand in a constant temperature bath maintained at 23° C., and 24 hours later, the sheet was taken out and the polypropylene sheet was peeled off. As a result, it was found that there was no sticking nature and that the impregnation of the resin mixture to the glass fiber was good. The SMC was cut to a size of 10 cm × 10 cm (180 g), charged into a mold having a size of 30 cm × 30 cm × 3 mm, and subjected to press molding at a molding temperature of 140° C. and molding pressure of 30 kg/cm$^2$ for 4 minutes. The shaped plate did not have drawbacks such as whitening, etc., and measurement of its area showed 805 cm$^2$. That is, the shaped plate showed a flowability ("degree of flowability" hereinbelow) of 8.05 times the charged area (100 cm$^2$).

The above results and the results of measurement of performances of the molded article are shown in Table 1.

As Table 1 shows, the molded article obtained from the composition of this invention has excellent impact resistance, and fruther it has high flexural strength and flexural modulus.

EXAMPLES 2-8

In each Example, Example 1 was repeated except that the types and amounts of the unsaturated polyester resin and the polyisocyanate compound and the amount of the glass fiber were changed as shown in Table 1, and the sticking nature of SMC, impregnatability, flowability at the press-molding time and performances of a molded article were evaluated. The results of the above evaluation are shown in Table 1.

Comparative Examples 1-7

In each Comparative Example, Example 1 was repeated except that the types and amounts of the unsaturated polyester resin and the polyisocyanate compound and the amount of the glass fiber were changed as shown in Table 2, and the sticking nature of SMC, impregnatability, flowability at the press-molding time and performances of a molded article were evaluated. The results of the above evaluation are shown in Table 2.

Comparative Example 8

Example 1 was repeated except that the type and amount of the unsaturated polyester resin and the amount of the glass fiber were changed as shown in Table 2 and that MgO was used in place of the polyisocyanate compound, and the sticking nature of SMC, impregnatability, flowability at the press-molding time and performances of a molded article were evaluated. The results of the above evaluation are shown in Table 2.

TABLE 1

| | Example | | | | | | | |
|---|---|---|---|---|---|---|---|---|
| | 1 | 2 | 3 | 4 | 5 | 6 | 7 | 8 |
| Unsaturated polyester resin [(A + C)] | | | | | | | | |
| type | A-I | A-I | A-I | A-II | A-III | A-IV | A-V | A-VI |
| amount, g | 661 | 661 | 661 | 564 | 675 | 690 | 504 | 741 |
| Polyisocyanate compound (B) | | | | | | | | |
| type*[1] | 143L | 181 | 240 | 143L | 143L | 143L | 143L | 143L |
| amount, g | 130 | 157 | 193 | 124 | 130 | 130 | 130 | 130 |
| Glass fiber (D) | | | | | | | | |
| amount, g | 1469 | 1227 | 1281 | 1397 | 1495 | 1523 | 1177 | 1618 |
| Analyzed value | | | | | | | | |
| weight %*[2] | 65.0 | 65.0 | 65.0 | 65.5 | 64.5 | 64.0 | 64.3 | 64.7 |
| molar ratio*[3] | 0.90 | 0.86 | 0.86 | 0.86 | 0.90 | 0.90 | 0.90 | 0.90 |
| weight %*[4] | 65.0 | 60.0 | 60.0 | 67.0 | 65.0 | 65.0 | 65.0 | 65.0 |
| SMC performance | | | | | | | | |
| sticking nature | none | none | none | none | none | none | none | none |
| impregnatability | good | good | good | good | good | good | good | good |
| degree of flowability*[5] | 8.05 | 7.36 | 7.21 | 8.06 | 7.99 | 7.72 | 7.75 | 8.20 |
| Performance of molded article*[6] | | | | | | | | |
| drawbacks*[7] | none | none | none | none | none | none | none | none |
| flexural strength | 47.7 | 44.3 | 41.8 | 47.3 | 44.2 | 42.2 | 41.8 | 40.2 |
| flexural modulus | 1805 | 1763 | 1710 | 1875 | 1761 | 1755 | 1780 | 1630 |
| Izod impact strength | 181 | 160 | 145 | 172 | 165 | 167 | 154 | 150 |

*[1]Polyisocyanate compound (made by MD Chemical)
143L = Isonate 143L (product name; viscosity 30 cps/25° C., NCO equivalent 144)
181 = Isonate 181 (product name; viscosity 900 cps/25° C., NCO equivalent 182)
240 = Isonate 240 (product name; viscosity 1500 cps/25° C., NCO equivalent 224)
*[2]weight % = unsaturated polyester(A) × 100/[(A) + styrene monomer(C)]
*[3]molar ratio = NCO group of polyisocyanate compound(B)/hydroxyl group of (A)
*[4]weight % = glass fiber(D) × 100/(A) + (B) + (C) + (D)]
*[5]degree of flowability at the press-molding time = flowed area/charged area
*[6]flexual strength [kg/mm$^2$] flexural modulus [kg/mm$^2$] Izod impact strength [kg · cm/cm]
*[7]Drawbacks stand for the presence of whitening, blisters by observation.

TABLE 2

| | Comparative Example | | | | | | | |
|---|---|---|---|---|---|---|---|---|
| | 1 | 2 | 3 | 4 | 5 | 6 | 7 | 8 |
| Unsaturated polyester resin [(A + C)] | | | | | | | | |

TABLE 2-continued

| | Comparative Example | | | | | | | |
|---|---|---|---|---|---|---|---|---|
| | 1 | 2 | 3 | 4 | 5 | 6 | 7 | 8 |
| type | A-I | A-I | A-I | A-I | B | C | D | E |
| amount, g | 661 | 661 | 661 | 661 | 1166 | 563 | 2528 | 1000 |
| Polyisocyanate compound (B) | | | | | | | | |
| type*1 | 143L | 143L | 143L | 143L | 143L | 143L | 143L | (MgO) |
| amount, g | 101 | 138 | 138 | 124 | 130 | 130 | 130 | 10 |
| Glass fiber (D) | | | | | | | | |
| amount, g | 1415 | 1484 | 1199 | 642 | 1944 | 1040 | 3987 | 1500 |
| Analyzed value | | | | | | | | |
| weight %*2 | 65.0 | 65.0 | 65.0 | 65.0 | 65.0 | 65.5 | 62.5 | 60.9 |
| molar ratio*3 | 0.70 | 0.96 | 0.96 | 0.86 | 0.90 | 0.90 | 0.90 | — |
| weight %*4 | 65.0 | 65.0 | 60.0 | 45.0 | 60.0 | 60.0 | 60.0 | 60.0 |
| SMC Performance | | | | | | | | |
| sticking nature | yes | no | no | no | no | no | no | no |
| impregnatability | good | poor | poor | good | poor | good | poor | good |
| degree of flowability*5 | 6.85 | 4.36 | 5.51 | 6.63 | 4.28 | 6.12 | 5.55 | 6.18 |
| Performance of molded article*6 | | | | | | | | |
| drawbacks | no | yes | yes | no | yes | no | yes | no |
| flexual strength | 36.5 | 34.3 | 31.8 | 27.3 | 34.2 | 32.2 | 35.8 | 30.2 |
| flexual modulus | 1615 | 1652 | 1542 | 1065 | 1590 | 1425 | 1410 | 1269 |
| Izod impact strength | 102 | 127 | 112 | 95 | 138 | 127 | 134 | 120 |

*1~*6 stand for the same meanings as in the Table 1
Yes = present, No = absent

EXAMPLE 9

1,727 g of the unsaturated polyester resin "A-II" obtained in Synthesis Example (II), 740 g of polyethylene glycol having a hydroxyl value of 369 mgKOH/g and 25 g of t-butyl perbenzoate were uniformly mixed, and then a polyisocyanate compound (Isonate 143L) was added and promptly mixed therewith uniformly. Then, the mixture was continuously supplied onto a polypropylene sheet by using an SMC manufacturing machine to prepare a roll-shaped SMC having a glass content of 65% by weight, a width of 45 cm and a thickness of 2 mm. The resultant SMC was wrapped with a cellophane film in order to prevent emanation of styrene, and aged in a chamber at a constant temperature of 23° C. for 3 days. After the aging, the polypropylene sheet was peeled off to give an SMC having no sticking nature, but having flexibility and good impregnatability to a glass fiber.

Thereafter, the SMC was cut to a size of 27 cm×27 cm (500 g), set on a 30 cm×30 cm plane plate mold mounted on a 100 ton press molding machine, and maintained at a molding temperature of 140° C. and a molding pressure of 100 kg/cm² for 5 minutes to obtain a shaped article having a size of 30 cm×30 cm and a thickness of 3 mm. The appearance of the resultant shaped article was uniform and the flowability of the SMC was good although its glass content was high.

The resultant molded article was cut to a size of 10 cm×10 cm, and then evaluated by carrying out the falling weight impact test.

As Table 3 shows, it is clear that addition of polyethylene glycol improves the impact resistance further.

EXAMPLE 10

Example 9 was repeated except for the use of 1,910 g of the unsaturated polyester resin "A-II" obtained in Synthesis Example (II), 818 g of polytetramethylene glycol having a hydroxyl value of 173 mgKOH/g, 27 g of t-butyl perbenzoate and 772 g of an isocyanate compound (Isonate 143L), and the impact resistance was evaluated in the same way as in Example 9.

The results of the evaluation were shown also in Table 3.

EXAMPLE 11

Example 9 was repeated except for the use of 2,842 g of the unsaturated polyester resin "A-II" obtained in Synthesis Example (II), 28 g of t-butyl perbenzoate and 658 g of an isocyanate compound (Isonate 143L), and the impact resistance was evaluated in the same way as in Example 9.

The results of the evaluation were shown also in Table 3.

Comparative Example 9

Example 9 was repeated except for the use of 3,500 g of the unsaturated polyester resin "F" obtained in Comparative Synthesis Example (5), 105 g of Zinc stearate, 70 g of magnesium oxide, 35 g of t-butyl perbenzoate and the content of glass fiber is 60 weight %, and the impact resistance was evaluated in the same way as in Example 9.

The result of the evaluation were shown also in Table 3.

TABLE 3

| | Example 9 | Example 10 | Example 11 | Comp. Example 9 |
|---|---|---|---|---|
| Unsaturated polyester resin [(A + C)] | | | | |
| type | A-II | A-II | A-II | F |
| amount, g | 1717 | 1901 | 2846 | 3500 |
| Polyhydric alcohol (E) | | | | |
| type*1 | a | b | — | — |
| amount, g | 750 | 830 | — | — |
| Polyisocyanate compound (B) | | | | |
| type | 143L | 143L | 143L | (MgO) |
| amount, g | 1034 | 769 | 654 | 70 |
| Analyzed value | | | | |
| ① *2 [wt %] | 40 | 40 | 0 | — |
| ② *3 [wt %] | 76.0 | 76.0 | 65.5 | 60.0 |
| ③ *4 [molar ratio] | 0.9 | 0.9 | 0.9 | — |
| ④ *5 [wt %] | 65 | 65 | 65 | 60 |
| Falling weight impact test | | | | |
| Fmax [kg] | 1045 | 1095 | 896 | 455 |
| Ei [kg · cm] | 255 | 287 | 184 | 127 |
| Ep [kg · cm] | 479 | 498 | 389 | 431 |
| Et (Ei + Ep) [kg · cm] | 734 | 765 | 573 | 551 |

*1 a = polyethylene glycol
  b = polytetramethylene glycol
*2 (E) × 100/[(A) + (E)]
*3 [(A) + (E)] × 100/[(A) + (E) + (C)]
*4 NCO group of (B)/[hydroxyl group of (A) + (E)]
*5 (D) × 100/[(A) + (B) + (C) + (D) + (E)]

EXAMPLE 12

A mixture of 10,000 g of polyisocyanate compound (Isonate 143L) and 780 g of t-butyl peroctoate was charged into a tank on the [A] side of a RIM machine, and maintained at a temperature of 30° C. Similarly, 10,000 g of the unsaturated polyester resin "A-II" was charged into a tank on the [B] side and maintained at a temperature of 40° C. Then, the flow rates were adjusted such that the [B]/[A] weight ratio was 3.6 at the time of injection to a mold.

Separately, 7 sheets of 450 g/m² glass mats cut in a size of 30 cm×30 cm were set in the mold adjusted to a size of 30 cm×30 cm and a thickness of 3 mm and maintained at a temperature of 60° C., and the mold was clamped. The above two liquids were injected into the mold through a mixing head at a rate of 150 g/second until the mold cavity was fully filled. The curing was effected for 15 minutes after the injection, and the mold was opened. As a result, a molded article was obtained.

The measurement of a glass content in the resultant molded article showed 63.5% by weight. The molded article had a flexural strength of 40.8 kg/mm², a flexural modulus of 1,680 kg/mm², a tensile strength of 28.6 kg/mm², a tensile modulus of 1,870 kg/mm² and an Izod impact strength of 146 kg·cm/cm.

What is claimed is:

1. A fiber-reinforced unsaturated polyester resin composition comprising, as main components, an unsaturated polyester (A), a polyhydric alcohol (E), a polyisocyanate compound (B), a polymerizable vinyl monomer (C) and a fiber (D), ① the unsaturated polyester (A) being obtained from a dicarboxylic acid or an anhydride thereof containing 40 to 100 mole % of an unsaturated dicarboxylic acid or its anhydride and a polyhydric alcohol having a primary hydroxyl group, and having a hydroxyl value of 115 to 210 mgKOH/g and acid value of not more than 5 mgKOH/g, ② the polyisocyanate compound (B) having its terminal group of

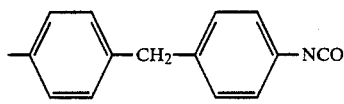

and a viscosity, at 25° C., of 10 to 2,000 cps and being in the liquid state,

③ the polyhydric alcohol (E) having at least 2 hydroxyl group in the molecule and having a hydroxyl value of 35 to 1,100 mgKOH/g, and further, said composition satisfying the following conditions (i), (ii), (iii) and (iv);

(i) the proportion of (E) is 10 to 50% by weight of the total weight of (A) and (E), (ii) the total weight of (A) and (E) is in the range of 50 to 85% by weight of the total weitht of (A), (E) and (C), (iii) the molar ratio of the isocyanate group of (B) to the hydroxyl group of (A) and (E) is 0.75 to 1.2, and (iv) the proportion of (D) is 50 to 70% by weight of the total weight of (A), (B), (C), (D) and (E).

2. A composition according to claim 1 wherein the polyhydric alcohol (E) is a glycol having a primary hydroxyl group.

3. A composition according to claim 1 wherein the polyhydric alcohol (E) represents at least one compound selected from the group consisting of polyethylene glycol and polytetramethylene glycol.

4. A composition according to claim 1 wherein the total weight of (A) and (E) is in the range of 60 to 80% by weight of the total weight of (A), (E) and (C).

5. A composition according to claim 1 wherein the molar ratio of the isocyanate group of (B) to the hydroxyl groups of (A) and (E) is 0.85 to 1.0.

* * * * *